(12) United States Patent
Kamei

(10) Patent No.: US 9,635,623 B2
(45) Date of Patent: Apr. 25, 2017

(54) BASE STATION

(71) Applicant: FUJITSU LIMITED, Kawasaki-shi, Kanagawa (JP)

(72) Inventor: Kenichi Kamei, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 256 days.

(21) Appl. No.: 14/551,203

(22) Filed: Nov. 24, 2014

(65) Prior Publication Data

US 2015/0163799 A1 Jun. 11, 2015

(30) Foreign Application Priority Data

Dec. 10, 2013 (JP) ................................ 2013-255366

(51) Int. Cl.
| | | |
|---|---|---|
| *H04W 4/00* | (2009.01) | |
| *H04W 52/38* | (2009.01) | |
| *H04W 16/08* | (2009.01) | |
| *H04W 52/34* | (2009.01) | |
| *H04W 52/14* | (2009.01) | |
| *H04W 52/32* | (2009.01) | |
| *H04L 5/00* | (2006.01) | |

(52) U.S. Cl.
CPC ......... *H04W 52/386* (2013.01); *H04W 16/08* (2013.01); *H04W 52/34* (2013.01); *H04L 5/001* (2013.01); *H04W 52/143* (2013.01); *H04W 52/325* (2013.01)

(58) Field of Classification Search
CPC . H04W 52/386; H04W 52/34; H04W 52/143; H04W 52/325; H04W 16/08; H04L 5/001
USPC ........................................................ 370/329
See application file for complete search history.

(56) References Cited

U.S. PATENT DOCUMENTS

| | | | |
|---|---|---|---|
| 2006/0099984 A1* | 5/2006 | Brusch ................. | H04W 52/34 455/522 |
| 2009/0141661 A1* | 6/2009 | Li ....................... | H04W 76/046 370/311 |
| 2011/0189944 A1* | 8/2011 | Wang .................... | H04B 7/155 455/7 |
| 2011/0194455 A1* | 8/2011 | Aminaka .............. | H04W 52/16 370/252 |

FOREIGN PATENT DOCUMENTS

| | | |
|---|---|---|
| JP | 2012-216969 | 11/2012 |
| WO | 2010103725 | 9/2010 |

* cited by examiner

*Primary Examiner* — Peter Cheng
(74) *Attorney, Agent, or Firm* — Fujitsu Patent Center

(57) ABSTRACT

A base station includes a communication unit that communicates with a communication terminal enabled to perform communication using a plurality of cells at the same time, and a controller that controls transmission power of each of the cells to change a size of a communication area of each of the cells so as to change a cell used by the communication terminal among the cells.

4 Claims, 16 Drawing Sheets

FIG.3

| PRIORITY | TERMINAL ID | QCI | THRESHOLD OF RETENTION AMOUNT (Byte) | RETENTION AMOUNT (Byte) | THRESHOLD OF RETENTION TIME (ms) | RETENTION TIME (ms) | CELL INFORMATION (dBm·P/S CELL) | | NUMBER OF RETRANSMISSION TIMES/THRESHOLD (NUMBER OF TIMES) |
|---|---|---|---|---|---|---|---|---|---|
| | | | | | | | C1 | C2 | |
| 1 | UE1 | 2 | 50 | 200 | 150 | 150 | -85·P | -90·S | 1/10 |
| 2 | UE5 | 2 | 50 | 0 | 150 | 0 | -75·P | -80·S | 0/10 |
| ⋮ | | | | | | | | | |
| 6 | UE2 | 6 | 100 | 50 | 300 | 100 | -99·P | -99·S | 1/10 |
| ⋮ | | | | | | | | | |

FIG.4

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversation Voice |
| 2 | | 4 | 150 ms | $10^{-3}$ | Conversation Video (Live Streaming) |
| 3 | | 3 | 50 ms | $10^{-3}$ | Real Time Gaming |
| 4 | | 5 | 300 ms | $10^{-6}$ | Non-Conversational Video (Bufferd Streaming) |
| 5 | Non-GBR | 1 | 100 ms | $10^{-6}$ | IMS Signalling |
| 6 | | 6 | 300 ms | $10^{-6}$ | Video (Bufferd Streaming) TCP-based(e.g., www, e-mail, chat, ftp, p2p file sharing, progressive video, etc) |
| 7 | | 7 | 100 ms | $10^{-3}$ | Voice, Video (Live Streaming) Interactive Gaming |
| 8 | | 8 | 300 ms | $10^{-6}$ | Video (Bufferd Streaming) TCP-based (e.g., www, e-mail, chat, ftp, p2p file sharing, progressive video, etc) |
| 9 | | 9 | | | |

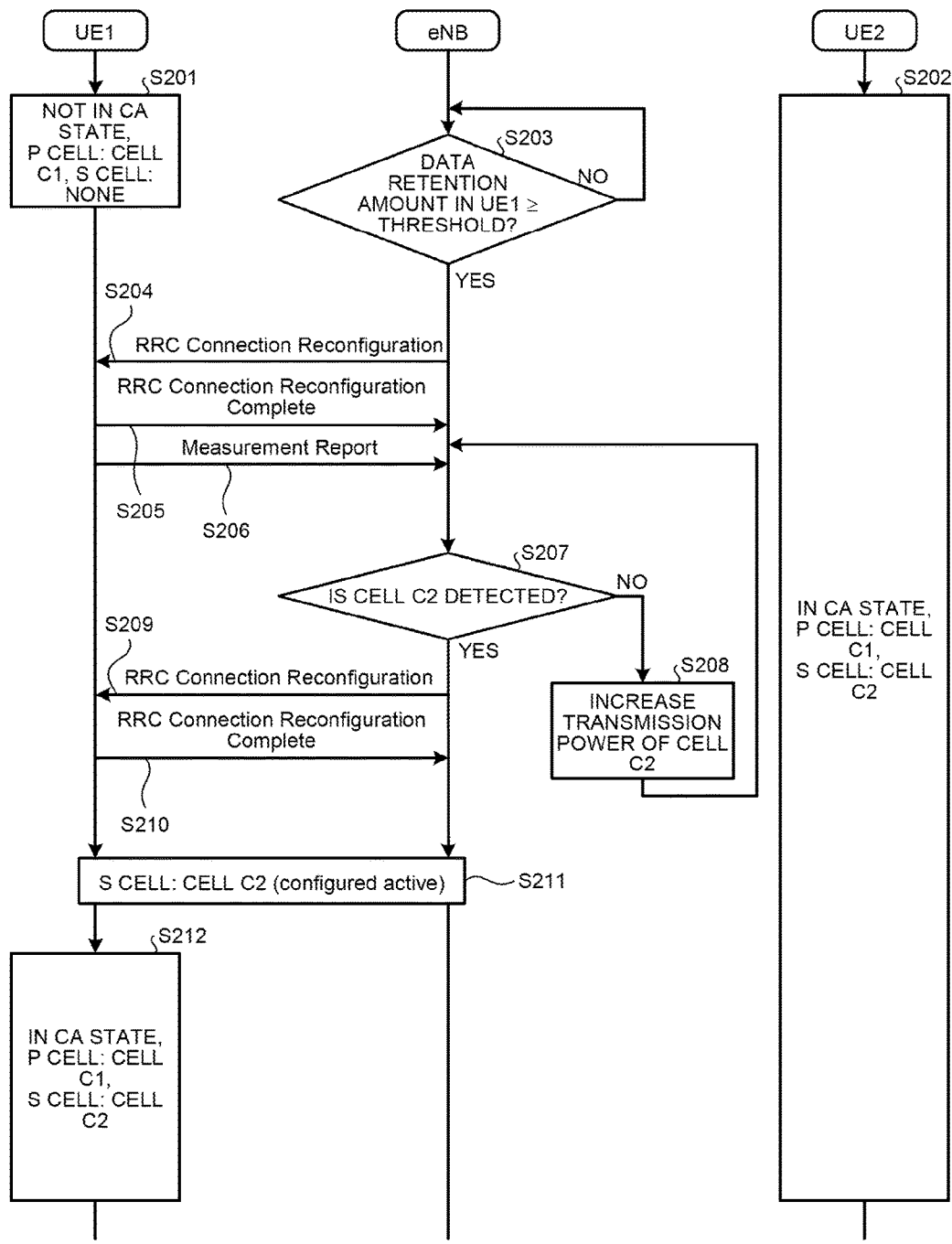

FIG.8

| PRIORITY | TERMINAL ID | QCI | THRESHOLD OF RETENTION AMOUNT (Byte) | RETENTION AMOUNT (Byte) | THRESHOLD OF RETENTION TIME (ms) | RETENTION TIME (ms) | CELL INFORMATION (dBm·P/S CELL) || NUMBER OF RETRANSMISSION TIMES/THRESHOLD (NUMBER OF TIMES) |
|---|---|---|---|---|---|---|---|---|---|
| | | | | | | | C1 | C2 | |
| 1 | UE1 | 2 | 50 | 10 | 150 | 0 | -85·P | -90·S | 1/10 |
| 2 | UE5 | 2 | 50 | 0 | 150 | 0 | -75·P | -80·S | 0/10 |
| ⋮ ||||||||||
| 6 | UE2 | 6 | 100 | 50 | 300 | 100 | - | -99·S | 1/10 |
| ⋮ ||||||||||

BASE STATION

CROSS-REFERENCE TO RELATED APPLICATION

This application is based upon and claims the benefit of priority of the prior Japanese Patent Application No. 2013-255366, filed on Dec. 10, 2013, the entire contents of which are incorporated herein by reference.

FIELD

The embodiments discussed herein are related to a base station.

BACKGROUND

In the related art, various efforts have been made to increase a transmission capacity (hereinafter, referred to as a "system capacity" in some cases) in a communication system. For example, regarding the 3rd Generation Partnership Project Radio Access Network Long Term Evolution (3GPP LTE), which is a communication standard, discussion has been made on a technique for increasing the system capacity utilizing a femtocell in addition to a macrocell. A "cell" herein is defined based on a "communication area" and a "channel frequency" of one base station. The "communication area" may be the entire area where radio waves transmitted from the base station reach, or a divided area (what is called a sector) obtained by dividing the communication area. The "channel frequency" is a unit of a frequency used for communication by the base station, and defined based on a center frequency and a bandwidth. The "macrocell" is a cell of a base station that can perform transmission with high transmission power, that is, a base station having a large communication area. The "femtocell" is a cell of a base station that performs transmission with low transmission power, that is, a base station having a small communication area.

In recent years, communication utilizing a plurality of frequency bands has been investigated to widen the band. For example, regarding the 3GPP LTE-Advanced, a communication technology of carrier aggregation (hereinafter, referred to as "CA" in some cases) has been investigated. The CA is a communication technology utilizing a plurality of component carriers (hereinafter, referred to as "CC" in some cases). The CC means a unit of the frequency band that can be used for communication. In other words, the CA is a technology that can perform communication using different frequency bands at the same time. That is, the CA is a communication technology that can use a plurality of cells at the same time. The CA may be performed by a plurality of base stations cooperating with each other, or may be performed by using a plurality of cells formed by one base station.

To perform CA, first, a "primary cell (hereinafter, referred to as a "P cell" in some cases)" is set as a cell corresponding to a primary first CC. Then a "secondary cell (hereinafter, referred to as an "S cell" in some cases)" serving as a cell corresponding to a second CC that is different from the first CC is integrated into the P cell, and the P cell and the S cell are used at the same time to perform CA. Because a communication terminal can be connected to only one cell when a radio channel is set, the cell to be connected therewith when the radio channel is set is the P cell. Thereafter, the P cell is changed in handover and the like. Alternatively, the S cell can be added, eliminated, or changed. The P cell is used for both of a control channel and a data channel. In contrast, the S cell is used only for the data channel. Accordingly, for example, the data channels of both of the P cell and the S cell are scheduled using the control channel of the P cell. The S cell is added, eliminated, or changed also using the control channel of the P cell, for example.

In the related art, a technology has been developed for determining the maximum transmission power of a mobile station with respect to each CC to transmit various channels at the same time in a wireless communication system to which the CA is applied. Related-art examples are described, for example, in International Publication Patent No. WO 2010/103725 and Japanese Laid-open Patent Publication No. 2012-216969.

A wireless communication system to which the CA is applied (hereinafter, referred to as a "CA system" in some cases) can cause one communication terminal to use a plurality of cells at the same time. Among the communication terminals, it is appropriate for some communication terminals and not appropriate for some communication terminals to perform CA, depending on a status and the like of each communication terminal. For example, communication resources are wasted when the CA is performed by a communication terminal that is not required to perform CA because an amount of data to be transmitted is small. Accordingly, it is important in the CA system to efficiently perform communication by improving flexibility in changing a cell used by each communication terminal.

SUMMARY

According to an aspect of an embodiment, a base station includes a communication unit that communicates with a communication terminal enabled to perform communication using a plurality of cells at the same time, and a controller that controls transmission power of each of the cells to change a size of a communication area of each of the cells so as to change a cell used by the communication terminal among the cells.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a management table according to the first embodiment;

FIG. 4 is a diagram illustrating an example of a QoS Class Identifier (QCI) according to the first embodiment;

FIG. 5 is a diagram illustrating an example of a processing sequence of a communication system according to the first embodiment;

FIG. 8 is a diagram illustrating an example of a management table according to the second embodiment;

DESCRIPTION OF EMBODIMENTS

Figure 1:
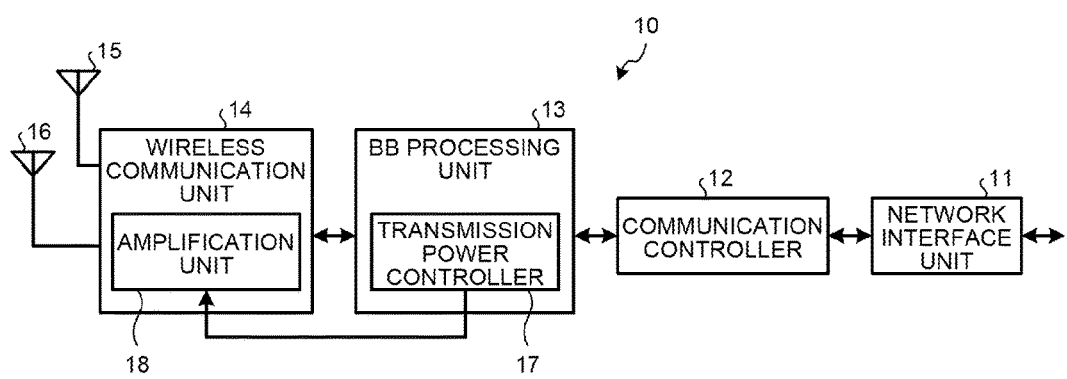
FIG. 1 is a functional block diagram illustrating an example of a base station according to a first embodiment.

Preferred embodiments of the present invention will be explained with reference to accompanying drawings. The base station according to the present invention is not limited to the embodiments. Components having the same function and steps for performing the same processing are denoted by the same reference numerals in each embodiment, and redundant description will not be repeated.

[a] First Embodiment

Configuration Example of Base Station

FIG. 1 is a functional block diagram illustrating an example of a base station according to a first embodiment. A base station 10 illustrated in FIG. 1 includes a network interface unit 11, a communication controller 12, a base band (BB) processing unit 13, a wireless communication unit 14, and antennas 15 and 16. The BB processing unit 13 includes a transmission power controller 17, and the wireless communication unit 14 includes an amplification unit 18. The antenna 15 is used for transmitting/receiving a signal having a channel frequency of f1, and the antenna 16 is used for transmitting/receiving a signal having a channel frequency of f2. The channel frequencies f1 and f2 are different from each other. Accordingly, a cell C1 for the channel frequency of f1 is formed by using the antenna 15, and a cell C2 for the channel frequency of f2 is formed by using the antenna 16. That is, the base station 10 can form a plurality of cells at the same time, in other words, CA can be performed by one base station. The number of antennas included in the base station 10, that is, the number of cells that can be formed by the base station 10 at the same time is not limited to two, and the number may be three or more. Hereinafter, for simplifying the description, the number of cells that can be formed by the base station 10 at the same time is assumed to be two, that is, the cell C1 and the cell C2.

The network interface unit 11 is connected to a host device such as a Mobility Management Entity (MME) and a Serving-Gateway (S-GW). For example, the network interface unit 11 transmits, to the host device, user data input from the BB processing unit 13 via the communication controller 12, and outputs the user data received from the host device to the BB processing unit 13 via the communication controller 12.

To control connection with a communication terminal through wireless communication, the communication controller 12 creates various control messages and outputs them to the BB processing unit 13. For example, the communication controller 12 determines a cell to be used by each communication terminal from among the cells C1 and C2 for each communication terminal. To change the cell to be used by each communication terminal, the communication controller 12 creates a control message of "RRC Connection Reconfiguration".

The BB processing unit 13 performs BB processing such as encoding processing and modulation processing on transmission data such as the control message and the user data to generate a base band transmission signal, and outputs the generated transmission signal to the wireless communication unit 14. The BB processing unit 13 also performs BB processing such as demodulation processing and decoding processing on a base band reception signal input from the wireless communication unit 14, obtains reception data such as the control message and the user data from the communication terminal, and outputs the reception data to the communication controller 12.

The wireless communication unit 14 performs digital-analog conversion processing, up-conversion processing, and the like on the base band transmission signal input from the BB processing unit 13, and transmits the up-converted transmission signal to the communication terminal via the antenna 15 or the antenna 16. In this case, the wireless communication unit 14 transmits the transmission signal while amplifying electric power thereof with the amplification unit 18. The transmission signal is amplified for each channel frequency, that is, for each cell. The wireless communication unit 14 also performs down-conversion processing, analog-digital conversion processing, and the like on the reception signal received via the antenna 15 or the antenna 16, and obtains the base band reception signal and outputs it to the BB processing unit 13. The wireless communication unit 14 communicates, via the antennas 15 and 16, with the communication terminal that can perform communication using the cell C1 and the cell C2 at the same time.

The transmission power controller 17 determines a transmission power value of each of the cells C1 and C2, and controls the transmission power of each of the cells C1 and C2. The transmission power controller 17 instructs the amplification unit 18 to use the determined transmission power value. According to the instruction, the amplification unit 18 amplifies the electric power of the transmission signal of each cell so as to be the transmission power value instructed by the transmission power controller 17. That is, the transmission power controller 17 controls the transmission power of each of the transmission signals having the channel frequencies f1 and f2, in other words, the transmission power of each of the cells C1 and C2, and changes the size of the communication area of each of the cells C1 and C2. A communication terminal positioned in the communication area of the cell C1, that is, the communication terminal within range of the cell C1 can communicate with the base station 10 using the cell C1. On the other hand, for a communication terminal positioned outside the communication area of the cell C1, that is, for the communication terminal out of range of the cell C1, it is difficult to communicate with the base station 10 using the cell C1. The same applies to the cell C2. Accordingly, the transmission power controller 17 controls the transmission power of each of the cells C1 and C2 so that the cell to be used for each communication terminal is changed between the cells C1 and C2, and changes the size of the communication area of each of the cells C1 and C2.

Operation of Base Station

Figure 2:
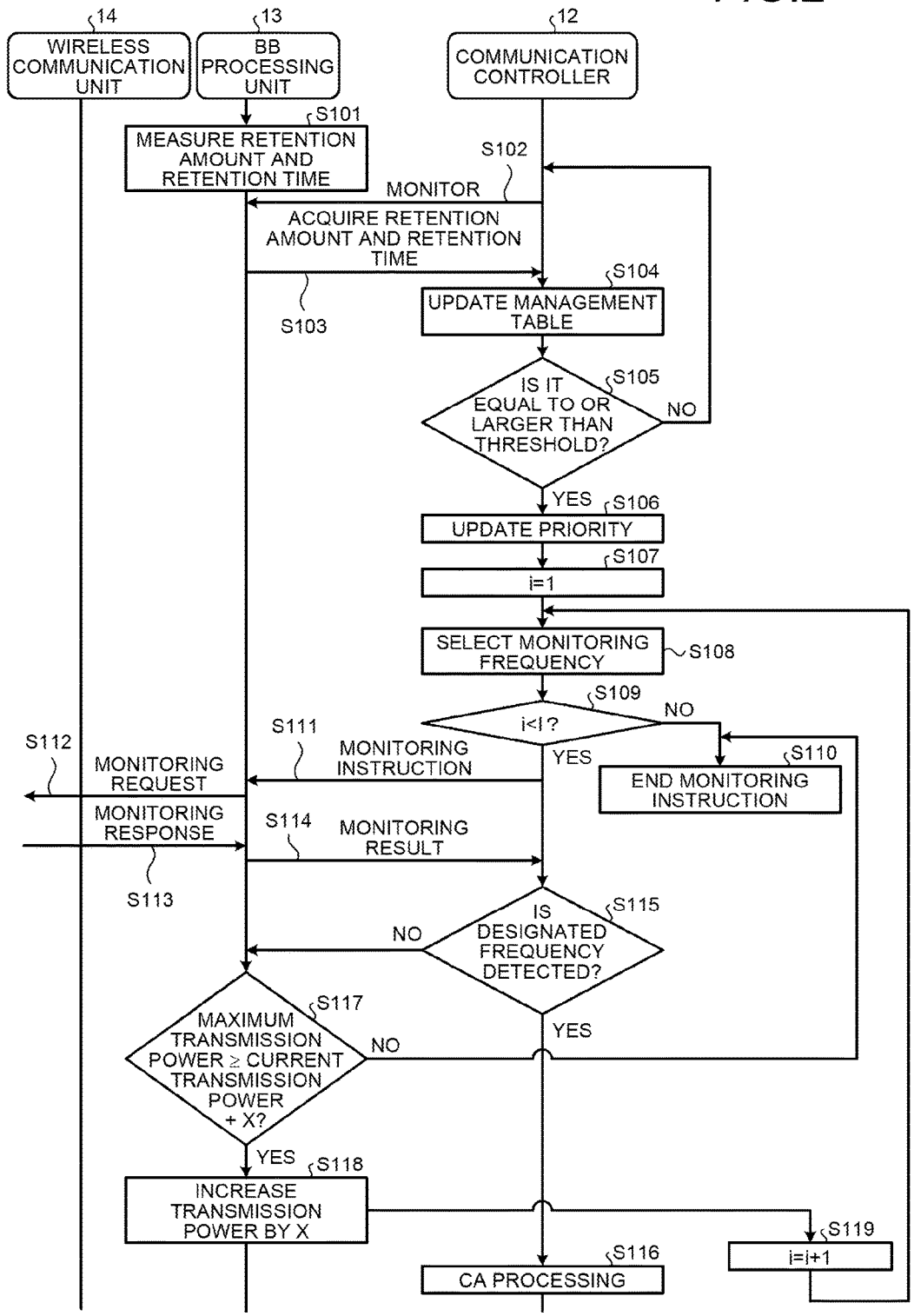
FIG. 2 is a flowchart for explaining an operation of the base station according to the first embodiment.

FIG. 2 is a flowchart for explaining an operation of the base station according to the first embodiment. Hereinafter, at the time when a process of the flowchart illustrated in FIG. 2 is started, a communication terminal UE1 that can perform communication using the cell C1 and the cell C2 at the same time is assumed to communicate with the base station 10 using only the cell C1 as the P cell. The communication controller 12 grasps that the communication terminal UE1 can perform CA using the channel frequencies f1 and f2 by inquiring of the communication terminal UE1 in advance about the channel frequency with which the communication can be performed.

In generating the base band transmission signal from the transmission data, the BB processing unit 13 temporarily stores the transmission data in a transmission buffer (not illustrated) included in the BB processing unit 13. Due to this, when the output of the transmission signal to the wireless communication unit 14 is delayed, the transmission buffer may overflow in some cases. For example, when the communication between the communication terminal and the base station 10 is momentarily interrupted because the communication terminal being connected to the base station 10 is temporarily shaded by a building and the like, it is difficult for the wireless communication unit 14 to transmit the transmission signal to the communication terminal, so that the transmission data is retained in the transmission buffer of the BB processing unit 13.

The BB processing unit 13 then successively measures a retention amount and retention time of the transmission data in the transmission buffer for each communication terminal (Step S101). The BB processing unit 13 starts the measurement of the retention time at the time when the retention amount becomes equal to or larger than a threshold, and ends the measurement at the time when the retention amount that temporarily becomes equal to or larger than a threshold is reduced to be smaller than the threshold again. The BB processing unit 13 may obtain, as a measurement result, an average value of the retention time that has been measured a plurality of times as described above.

The communication controller 12 monitors the measurement result at Step S101 obtained by the BB processing unit 13 at a regular interval (Step S102), and acquires the retention amount and the retention time of the transmission data from the BB processing unit 13 (Step S103). The communication controller 12 updates a "management table" included in the communication controller 12 based on the acquired retention amount and retention time (Step S104).

FIG. 3 is a diagram illustrating an example of the management table according to the first embodiment. As illustrated in FIG. 3, the management table includes items of priority, terminal ID, QoS Class Identifier (QCI), threshold of retention amount, retention amount, threshold of retention time, retention time, cell information, and the number of retransmission times/threshold. Each of the items is updated by the communication controller 12. The terminal ID is information that can uniquely specify each communication terminal. The QCI is included in E-RAB Level QoS Parameters of a message notified from the host device when a bearer of the communication terminal is set. Appropriate value of the threshold of retention amount is set corresponding to the capacity of the transmission buffer. The threshold of retention time is set corresponding to the QCI. The retention amount and the retention time are updated based on an acquisition result by the communication controller 12. The cell information is separately managed for the cell C1 and the cell C2, and the cell information manages a value of reference signal received power (RSRP) value of each cell in each communication terminal, and manages whether each cell in each terminal is the P cell or the S cell. The number of retransmission times is the number of times of retransmission of the transmission data performed by the BB processing unit 13. An appropriate value is set for the threshold of the number of retransmission times based on desired throughput and the like.

FIG. 4 is a diagram illustrating an example of the QCI according to the first embodiment. The QCI illustrated in FIG. 4 is defined in "3GPP TS 23.203 Table 6.1.7: Standardized QCI characteristics".

Returning to FIG. 2, the communication controller 12 determines, for each communication terminal, whether both of the retention amount and the retention time of the transmission data are equal to or larger than the threshold, that is, whether the retention amount of the transmission data has been continuously equal to or larger than the threshold for a certain period of time or more (Step S105). Regarding all of the communication terminals on the management table, when one or both of the retention amount and the retention time of the transmission data are smaller than the threshold (No at Step S105), the communication controller 12 continues to monitor the BB processing unit 13 (Step S102).

On the other hand, when there is a communication terminal in which both of the retention amount and the retention time of the transmission data are equal to or larger than the threshold (Yes at Step S105), the communication controller 12 updates the priority of the communication terminal in which both of the retention amount and the retention time are equal to or larger than the threshold in the management table (Step S106). Each parameter is evaluated in the following order in updating the priority. That is, the communication controller 12 sorts the communication terminals in order from a small value of the QCI illustrated in FIG. 4, that is, in descending order of a QCI level, sorts in descending order of the retention amount, and sorts in descending order of the retention time. The communication controller 12 then specifies the communication terminal in which the retention amount of the transmission data has been continuously equal to or larger than the threshold for a certain period of time or more from among the communication terminals having higher priority (Step S106). The communication terminals "having higher priority" mean the communication terminals within 5% of all of the communication terminals being connected to the base station 10, top three from the communication terminal having the highest priority, the communication terminals within 10% of the maximum number of the communication terminals that can be connected to the base station 10, for example. An arbitrary value can be set as the threshold of "having higher priority". In contrast, the communication terminals "having lower priority" mean the communication terminals other than the communication terminals having higher priority among all of the communication terminals being connected to the base station 10. It is assumed herein that the communication terminal UE1 is specified as the communication terminal in which the retention amount of the transmission data has been continuously equal to or larger than the threshold for a certain period of time or more from among the communication terminals having higher priority.

The communication controller 12 sets a counter i to 1 as an initial value (Step S107).

The communication controller 12 compares the channel frequency with which the communication terminal UE1 can perform communication to the channel frequency with which the wireless communication unit 14 can perform communication. The communication controller 12 then selects the channel frequency that is the closest to the channel frequency for the P cell of the communication terminal UE1 from among the frequencies common thereto, and designates it as a monitoring frequency (Step S108). The channel frequency with which the communication terminal UE1 can perform communication and the channel frequency with which the wireless communication unit 14 can perform communication are both f1 and f2. When the channel frequency for the P cell of the communication terminal UE1 is f1, the communication controller 12 designates the channel frequency f2 adjacent to the channel frequency f1 as the monitoring frequency.

The communication controller 12 determines whether the value of the counter i is less than a predetermined threshold I (Step S109). When the value of the counter i is equal to or larger than the threshold I (No at Step S109), the communication controller 12 ends a monitoring instruction performed at Step S111 (Step S110).

On the other hand, when the value of the counter i is less than the threshold I (Yes at Step S109), the communication controller 12 outputs, to the BB processing unit 13, the monitoring instruction as a control message for instructing the communication terminal UE1 to use the monitoring frequency f2 (Step S111). The BB processing unit 13 outputs a monitoring request including the monitoring instruction to the wireless communication unit 14. The wireless communication unit 14 transmits the monitoring request to the communication terminal UE1 using the cell C1 as the P cell of the communication terminal UE1, that is, via the antenna 15 with the channel frequency f1 (Step S112).

Corresponding to the monitoring request transmitted at Step S112, the communication terminal UE1 transmits, to the base station 10, a monitoring response including an RSRP value with the channel frequency f2 as a monitoring result. The monitoring response is received by the wireless communication unit 14 via the antenna 15, and input to the BB processing unit 13 (Step S113). The communication controller 12 acquires the monitoring result, that is, the RSRP value with the channel frequency f2 in the communication terminal UE1 from the monitoring response after the BB processing (Step S114).

From the monitoring result, the communication controller 12 determines whether the communication terminal UE1 detects the channel frequency f2 (that is, the cell C2) designated by the communication controller 12 at Step S109 (Step S115). It is herein determined whether the communication terminal UE1 detects the channel frequency f2 based on whether the RSRP value with the channel frequency f2 is larger than a reception limit value of the communication terminal UE1. That is, when the RSRP value with the channel frequency f2 is larger than the reception limit value, the communication controller 12 determines that the communication terminal UE1 detects the channel frequency f2. On the other hand, when the RSRP value with the channel frequency f2 is equal to or smaller than the reception limit value, the communication controller 12 determines that the communication terminal UE1 does not detect the channel frequency f2.

When the communication terminal UE1 detects the channel frequency f2 (Yes at Step S115), the communication controller 12 performs CA processing (Step S116). The CA processing includes creating a control message of "RRC Connection Reconfiguration" including an instruction for the communication terminal UE1 to connect to the cell C2. When the communication controller 12 performs the CA processing, the communication terminal UE1 performs communication using the cell C2 as the S cell in addition to the cell C1 as the P cell. That is, the communication terminal UE1 starts CA using both of the cell C1 and the cell C2 at the same time.

When the communication terminal UE1 does not detect the channel frequency f2 (No at Step S115), the transmission power controller 17 determines whether a value of the current transmission power of the channel frequency f2 to which a predetermined amount X is added is equal to or smaller than the maximum transmission power (Step S117). When the value of the current transmission power of the channel frequency f2 to which the predetermined amount X is added is larger than the maximum transmission power (No at Step S117), the communication controller 12 ends the monitoring instruction performed at Step S111 (Step S110).

When the value of the current transmission power of the channel frequency f2 to which the predetermined amount X is added is equal to or smaller than the maximum transmission power (Yes at Step S117), the transmission power controller 17 and the amplification unit 18 increase the transmission power of the channel frequency f2 by the predetermined amount X (Step S118). When the transmission power of the channel frequency f2 is increased by the predetermined amount X, the communication area of the cell C2 is expanded by an amount corresponding to the predetermined amount X. The communication controller 12 increments the counter i by 1 (Step S119), and performs the process at Step S108 again.

Processing Sequence of Communication System

FIG. 5 is a diagram illustrating an example of a processing sequence of the communication system according to the first embodiment. A base station eNB in FIG. 5 corresponds to the base station 10 in FIG. 1. The communication terminals UE1 and UE2 are communication terminals that can perform communication using the cell C1 and the cell C2 at the same time. At the time when the processing sequence illustrated in FIG. 5 is started, the base station eNB is being connected to the communication terminals UE1 and UE2. The communication terminal UE1 is being connected thereto using only the cell C1, so that the P cell of the communication terminal UE1 is the cell C1. The communication terminal UE2 is being connected thereto using both of the cell C1 and the cell C2, and the cell C1 is the P cell and the cell C2 is the S cell. That is, the communication terminal UE1 is not in a CA state (Step S201), and the communication terminal UE2 is in the CA state (Step S202).

The base station eNB determines whether the retention amount and the retention time of the transmission data to be transmitted to the communication terminal UE1 are equal to or larger than the threshold (Step S203). When the retention amount or the retention time is less than the threshold (No at Step S203), the base station eNB repeats the determination at Step S203.

When both of the retention amount and the retention time of the transmission data to be transmitted to the communication terminal UE1 are equal to or larger than the threshold, that is, when the retention amount has been continuously equal to or larger than the threshold for a certain period of time or more (Yes at Step S203), the base station eNB performs the following process. That is, the base station eNB transmits, to the communication terminal UE1, RRC Connection Reconfiguration including the monitoring instruction for instructing the communication terminal UE1 to use the monitoring frequency f2 with the channel frequency f1 (that is, using the cell C1) (Step S204). On the other hand, the communication terminal UE1 transmits RRC Connection Reconfiguration Complete to the base station eNB (Step S205), and starts to transmit Measurement Report including the RSRP value with the channel frequency f2 as the monitoring result to the base station eNB (Step S206). That is, RRC Connection Reconfiguration at Step S204 corresponds to the monitoring request at Step S112 in FIG. 2, and Measurement Report at Step S206 corresponds to the monitoring response at Step S113 in FIG. 2.

The base station eNB determines whether the communication terminal UE1 detects the channel frequency f2, that is, the cell C2 based on the monitoring result (Step S207). When the communication terminal UE1 does not detect the cell C2 (No at Step S207), the base station eNB increases the transmission power of the cell C2 by a predetermined amount (Step S208), and repeats the determination at Step S207 based on Measurement Report.

When the communication terminal UE1 detects the cell C2 (Yes at Step S207), the base station eNB transmits, to the communication terminal UE1, RRC Connection Reconfiguration including an instruction to connect to the cell C2 (Step S209). On the other hand, the communication terminal UE1 transmits RRC Connection Reconfiguration Complete to the base station eNB (Step S210). Accordingly, a connection using the cell C2 as the S cell is established between the base station eNB and the communication terminal UE1 (Step S211). That is, the communication terminal UE1 starts CA using both of the cell C1 and the cell C2 at the same time to be in the CA state (Step S212).

Operation of Communication System

Figure 6:
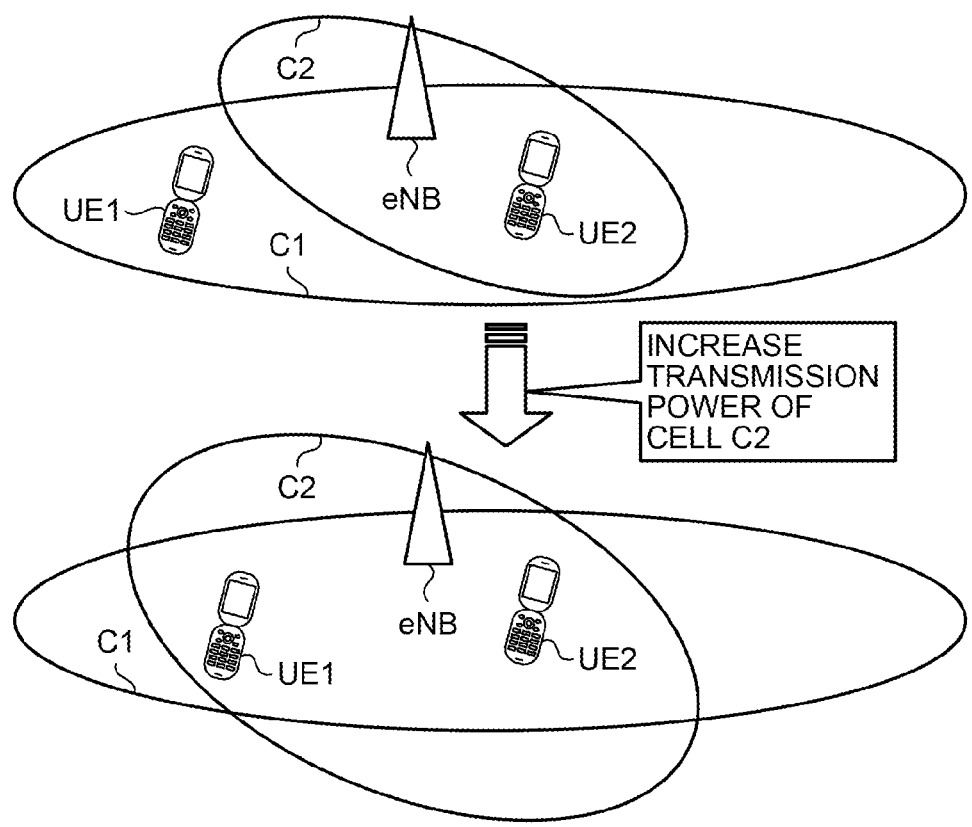
FIG. 6 is a diagram for explaining an operation of the communication system according to the first embodiment.

FIG. 6 is a diagram for explaining an operation of the communication system according to the first embodiment. The upper diagram of FIG. 6 illustrates a state in which the communication terminal UE1 is in connection using only the cell C1 and the communication terminal UE2 is in connection using both of the cell C1 and the cell C2 as described at Steps S201 and S202 in FIG. 5. In this state, when the retention amount of the transmission data to be transmitted to the communication terminal UE1 has been continuously equal to or larger than the threshold for a certain period of time or more, the base station eNB increases the transmission power of the cell C2 until the communication terminal UE1 detects the cell C2, that is, until the communication terminal UE1 is within range of the cell C2. Due to this, as illustrated in the lower diagram of FIG. 6, the communication terminal UE1 can be connected to the base station eNB using the cell C2 in addition to the cell C1, so that the communication terminal UE1 starts CA using both of the cell C1 and the cell C2 at the same time. When the communication terminal UE1 starts CA, communication resources allocated to the communication terminal UE1 are increased, so that retention of the transmission data to be transmitted to the communication terminal UE1 is eliminated in the base station eNB. At the time when the retention of the transmission data to be transmitted to the communication terminal UE1 is eliminated, the base station eNB may release the cell C2 from the communication terminal UE1 to end CA of the communication terminal UE1.

As described above, according to the embodiment, the wireless communication unit 14 communicates with the communication terminals UE1 and UE2 that can perform communication using the cell C1 and the cell C2 at the same time. The transmission power controller 17 increases the transmission power of the cell C2 so that both of the cell C1 and the cell C2 are used by the communication terminal UE1 at the same time when the retention amount of the transmission data to be transmitted to the communication terminal UE1 communicating with the base station 10 using only the cell C1 has been continuously equal to or larger than the threshold for a certain period of time or more. That is, only when the retention amount of the transmission data to be transmitted to the communication terminal UE1 has been continuously equal to or larger than the threshold for a certain period of time or more, the transmission power controller 17 increases the transmission power of the cell C2 to cause the communication terminal UE1 to be within range of the cell C2. Due to this, the communication terminal UE1 does not need to transmit signaling (for example, Measurement Report) for connecting with the cell C2 to the base station 10 until the retention amount of the transmission data in the base station 10 has been continuously equal to or larger than the threshold for a certain period of time or more. When the signaling transmitted from the communication terminal UE1 is decreased, power consumption of the communication terminal UE1 can be reduced as compared with a case in which the communication terminal UE1 is always caused to perform CA regardless of the retention amount of the data. According to the embodiment, communication can be efficiently performed in terms of the power consumption.

[b] Second Embodiment

Operation of Base Station

Figure 7:
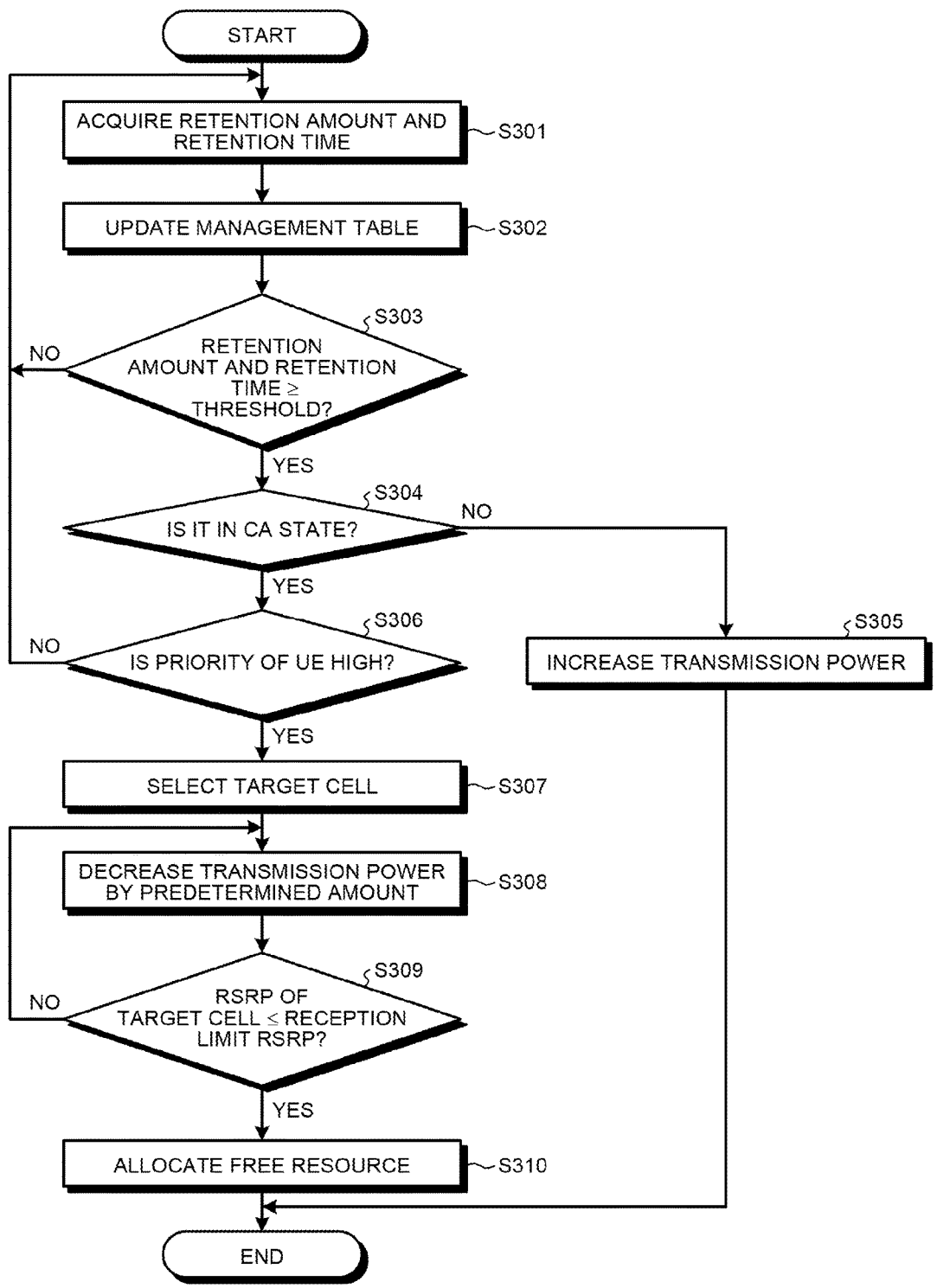
FIG. 7 is a flowchart for explaining an operation of a base station according to a second embodiment.

FIG. 7 is a flowchart for explaining the operation of the base station according to a second embodiment. As in the first embodiment, the BB processing unit 13 successively measures the retention amount and the retention time of the transmission data in the transmission buffer for each communication terminal.

The communication controller 12 monitors the measurement result by the BB processing unit 13 at a regular interval, and acquires the retention amount and the retention time of the transmission data from the BB processing unit 13 (Step S301). The communication controller 12 updates the management table (FIG. 3) included in the communication controller 12 based on the acquired retention amount and retention time (Step S302).

The communication controller 12 determines, for each communication terminal, whether both of the retention amount and the retention time of the transmission data are equal to or larger than the threshold, that is, whether the retention amount of the transmission data has been continuously equal to or larger than the threshold for a certain period of time or more (Step S303). Regarding all of the communication terminals on the management table, when one or both of the retention amount and the retention time are less than the threshold (No at Step S303), the communication controller 12 continues to acquire the measurement result with the BB processing unit 13 (Step S301).

When there is a communication terminal in which both of the retention amount and the retention time are equal to or larger than the threshold (Yes at Step S303), the communication controller 12 determines whether the communication terminal is in the CA state (Step S304). For example, when the communication terminal that can perform communication using the cell C1 and the cell C2 at the same time is connected to the base station 10 using only one of the cell C1 and the cell C2, the communication terminal is not in the CA state. On the other hand, when the communication terminal that can perform communication using the cell C1 and the cell C2 at the same time is connected to the base station 10 using both of the cell C1 and the cell C2 at the same time, the communication terminal is in the CA state.

When the communication terminal in which both of the retention amount and the retention time are equal to or larger than the threshold is not in the CA state (No at Step S304), as in the first embodiment, the communication controller 12 instructs the transmission power controller 17 to increase the transmission power of a cell that is not used by the communication terminal. Following the instruction, the transmission power controller 17 and the amplification unit 18 increase the transmission power of the cell not used by the communication terminal that is not in the CA state, and causes the communication terminal to be in the CA state (Step S305) to end the process.

When the communication terminal in which both of the retention amount and the retention time are equal to or larger than the threshold is in the CA state (Yes at Step S304), the communication controller 12 performs the following process. That is, after updating the priority of the communication terminal in the management table as in the first embodiment, the communication controller 12 determines whether the priority of the communication terminal is high, as in the first embodiment (Step S306). When the priority is not high (No at Step S306), the process returns to Step S301.

When the priority is high at Step S306 (Yes at Step S306), the communication controller 12 selects a "target cell" (Step S307). The "target cell" is a cell the transmission power of which is to be decreased. For example, the communication terminal UE1 in which the retention amount of the transmission data from the base station 10 has been continuously equal to or larger than the threshold for a certain period of time or more is being connected to the base station 10 using both of the cell C1 and the cell C2, the cell C1 and the cell C2 are "candidates for the target cell". The communication controller 12 specifies a cell being used by another communication terminal, for example, the communication terminal UE2, from among the cells C1 and C2 serving as the candidates for the target cell with reference to the management table. For example, in FIG. 3, the communication terminal UE2 is being connected to the base station 10 using both of the cell C1 and the cell C2. The P cell of the communication terminal UE2 is the cell C1, and the S cell thereof is the cell C2. The communication terminal UE2 is assumed to be a communication terminal having lower priority. The communication controller 12 selects the cell C1 being the P cell of the communication terminal UE2 having lower priority as the target cell from among the cells C1 and C2 serving as the candidates for the target cell, and instructs the transmission power controller 17 to use the selected target cell.

Following the instruction from the communication controller 12, the transmission power controller 17 and the amplification unit 18 decrease the transmission power of the target cell by a predetermined amount (Step S308).

For example, because the communication terminal UE2 is being connected to the base station 10 using both of the cell C1 and the cell C2 herein, the communication terminal UE2 successively reports the RSRP value with each of the channel frequencies f1 and f2 to the base station 10. When the target cell is the cell C1, the communication controller 12 determines whether the RSRP value with the channel frequency f1 corresponding to the cell C1 in the communication terminal UE2 is equal to or smaller than the reception limit value of the communication terminal UE2 (Step S309). When the RSRP value with the channel frequency f1 in the communication terminal UE2 is not equal to or smaller than the reception limit value (No at Step S309), the process returns to Step S308, and the transmission power of the target cell is further decreased by a predetermined amount.

When the RSRP value with the channel frequency f1 in the communication terminal UE2 is equal to or smaller than the reception limit value, it is difficult for the communication terminal UE2 to be connected to the base station 10 using the cell C1. Accordingly, the communication resource used by the communication terminal UE2 with the channel frequency f1 is released to be a free resource in the cell C1. When the RSRP value with the channel frequency f1 in the communication terminal UE2 is equal to or smaller than the reception limit value (Yes at Step S309), the communication controller 12 allocates the free resource in the cell C1 to the communication terminal UE1 (Step S310). When the free resource is allocated to the communication terminal UE1, the communication resources that can be used by the communication terminal UE1 are increased. Accordingly, retention of the transmission data to be transmitted to the communication terminal UE1 is eliminated in the base station 10. For example, the management table is updated from FIG. 3 to FIG. 8. FIG. 8 is a diagram illustrating an example of the management table according to the second embodiment. In FIG. 8, the communication terminal UE2 is out of range of the cell C1, so that the free resource in the cell C1 is allocated to the communication terminal UE1. Accordingly, the retention amount for the communication terminal UE1 becomes smaller than the threshold and the retention time becomes 0.

Processing Sequence of Communication System

Figure 9:
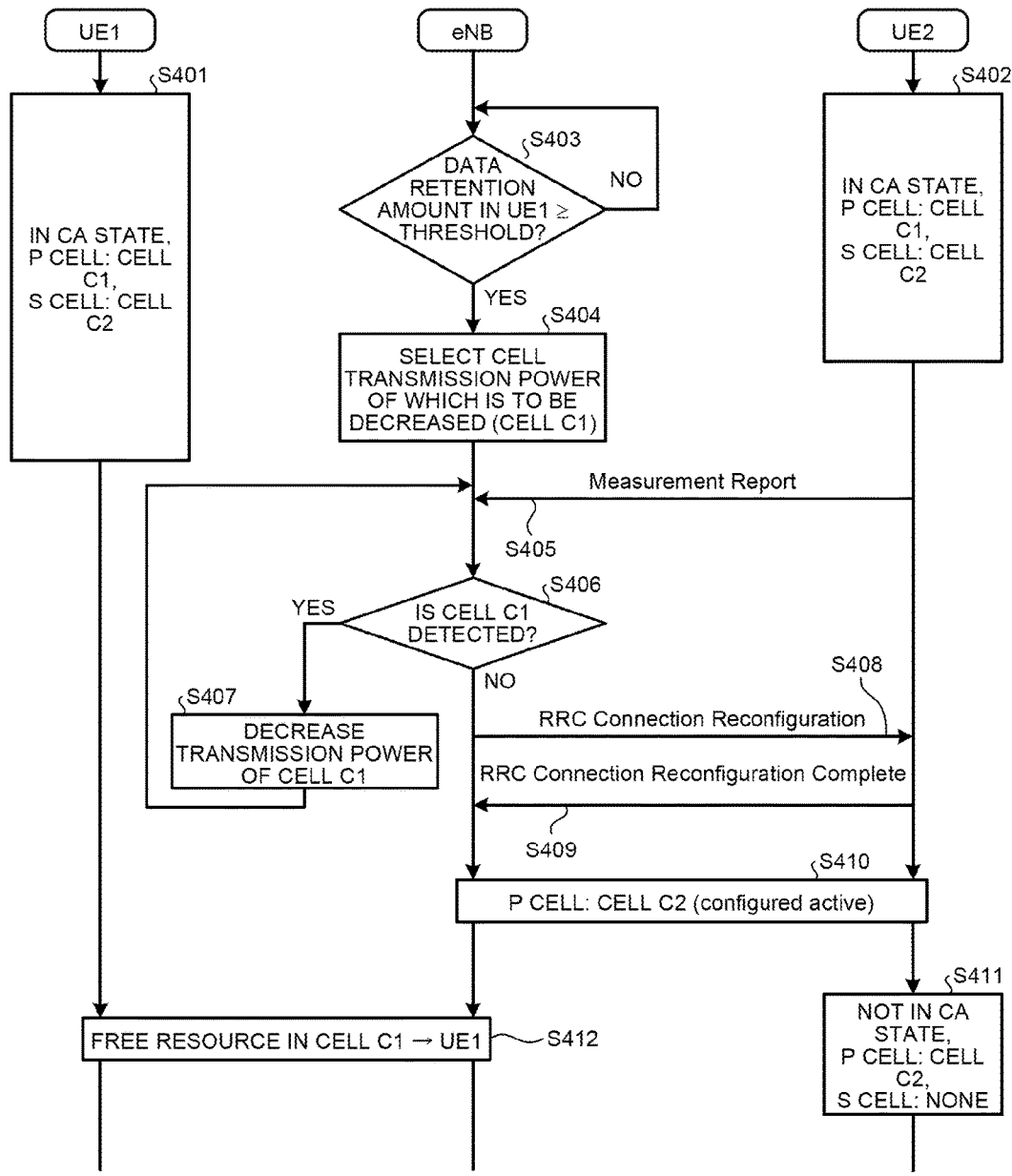
FIG. 9 is a diagram illustrating an example of a processing sequence of a communication system according to the second embodiment.

FIG. 9 is a diagram illustrating an example of a processing sequence of the communication system according to the second embodiment. The base station eNB in FIG. 9 corresponds to the base station 10 in FIG. 1. At the time when the processing sequence illustrated in FIG. 9 is started, both of the communication terminals UE1 and UE2 are being connected to the base station eNB using both of the cell C1 and the cell C2. In this case, the cell C1 is the P cell and the cell C2 is the S cell. That is, both of the communication terminals UE1 and UE2 are in the CA state (Steps S401 and S402).

The base station eNB determines whether the retention amount and the retention time of the transmission data to be transmitted to the communication terminal UE1 are equal to or larger than the threshold (Step S403). When the retention amount or the retention time is smaller than the threshold (No at Step S403), the base station eNB repeats the determination at Step S403.

When both of the retention amount and the retention time of the transmission data to be transmitted to the communication terminal UE1 are equal to or larger than the threshold, that is, when the retention amount has been continuously equal to or larger than the threshold for a certain period of time or more (Yes at Step S403), the base station eNB performs the following process. That is, the base station eNB selects the target cell, that is, a cell the transmission power of which is to be decreased (Step S404). It is herein assumed that the cell C1 is selected as the target cell.

The communication terminal UE2 successively reports Measurement Report including the RSRP value with each of the channel frequencies f1 and f2 to the base station eNB (Step S405).

The base station eNB determines whether the communication terminal UE2 detects the channel frequency f1, that is, the cell C1 based on Measurement Report (Step S406). When the communication terminal UE2 detects the cell C1 (Yes at Step S406), the base station eNB decreases the transmission power of the cell C1 by a predetermined amount (Step S407), and repeats the determination at Step S406 based on Measurement Report.

When the communication terminal UE2 does not detect the cell C1 because the transmission power of the cell C1 is decreased (No at Step S406), the base station eNB transmits, to the communication terminal UE2, RRC Connection Reconfiguration including an instruction to use the cell C2 as the P cell (Step S408). On the other hand, the communication terminal UE2 transmits RRC Connection Reconfiguration Complete to the base station eNB (Step S409). Accordingly, a connection using the cell C2 as the P cell is established between the base station eNB and the communication terminal UE2 (Step S410). That is, the P cell of the communication terminal UE2 is changed from the cell C1 to the cell C2. At this time, the communication terminal UE2 is out of range of the cell C1. Accordingly, the communication terminal UE2 is in a state being connected to the base station eNB using only the cell C1 (Step S411). Due to this, the communication resource used by the communication terminal UE2 in the cell C1 is released to be a free resource in the cell C1. The base station eNB then allocates the free resource in the cell C1 to the communication terminal UE1 (Step S412).

Operation of Communication System

Figure 10:
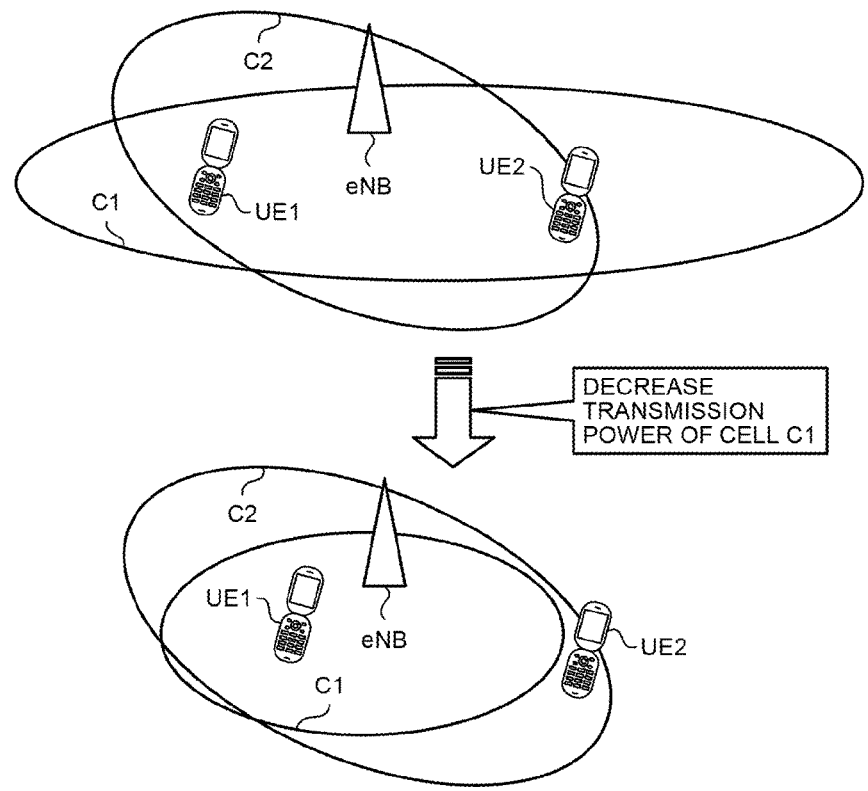
FIG. 10 is a diagram for explaining an operation of the communication system according to the second embodiment.

FIG. 10 is a diagram for explaining the operation of the communication system according to the second embodiment. The upper diagram of FIG. 10 illustrates a state in which both of the communication terminals UE1 and UE2 are being connected to the base station eNB using both of the cell C1 and the cell C2 as described at Steps S401 and S402 in FIG. 9. In this state, when the retention amount of the transmission data to be transmitted to the communication terminal UE1 has been continuously equal to or larger than the threshold for a certain period of time or more, the base station eNB decreases the transmission power of the cell C1 until the state of the lower diagram in FIG. 10 is obtained. That is, the base station eNB decreases the transmission power of the cell C1 until the communication terminal UE2 does not detect the cell C1, that is, until the communication terminal UE2 is out of range of the cell C1. Due to this, the communication resource used by the communication terminal UE2 in the cell C1 is released to be a free resource in the cell C1. The base station eNB then allocates the free resource in the cell C1 to the communication terminal UE1. When the free resource is allocated to the communication terminal UE1, the communication resources that can be used by the communication terminal UE1 are increased. Accordingly, retention of the transmission data to be transmitted to the communication terminal UE1 is eliminated in the base station eNB.

Example of Allocation of Communication Resources

Figure 11:
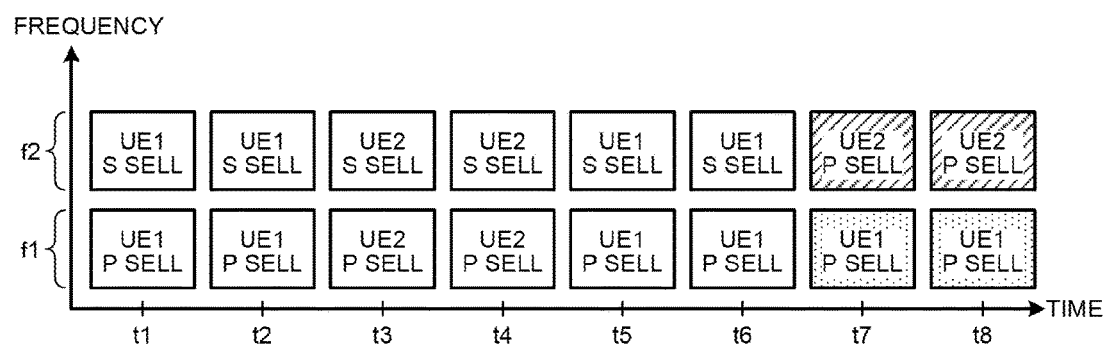
FIG. 11 is a diagram illustrating an example of allocation of communication resources according to the second embodiment.

FIG. 11 is a diagram illustrating an example of allocation of the communication resources according to the second embodiment. The allocation of the communication resources to each communication terminal is performed by the communication controller 12.

At times t1 and t2, the communication resource of the channel frequency f1 is allocated to the P cell of the communication terminal UE1, and the communication resource of the channel frequency f2 is allocated to the S cell of the communication terminal UE1. At times t3 and t4, the communication resource of the channel frequency f1 is allocated to the P cell of the communication terminal UE2, and the communication resource of the channel frequency f2 is allocated to the S cell of the communication terminal UE2. At times t5 and t6, the communication resource of the channel frequency f1 is allocated to the P cell of the communication terminal UE1, and the communication resource of the channel frequency f2 is allocated to the S cell of the communication terminal UE1.

At a time t7, the retention amount of the transmission data to be transmitted to the communication terminal UE1 had been continuously equal to or larger than the threshold for a certain period of time or more. Due to this, the transmission power of the cell C1 is decreased until the communication terminal UE2 is out of range of the cell C1. Accordingly, at times t7 and t8, the P cell of the communication terminal UE2 is changed from the cell C1 to the cell C2. The free resource in the cell C1 generated according to the change is allocated to the P cell of the communication terminal UE1. Accordingly, the communication resources used by the communication terminal UE1 are increased, and retention of the transmission data to be transmitted to the communication terminal UE1 is eliminated in the base station eNB.

Figure 12:
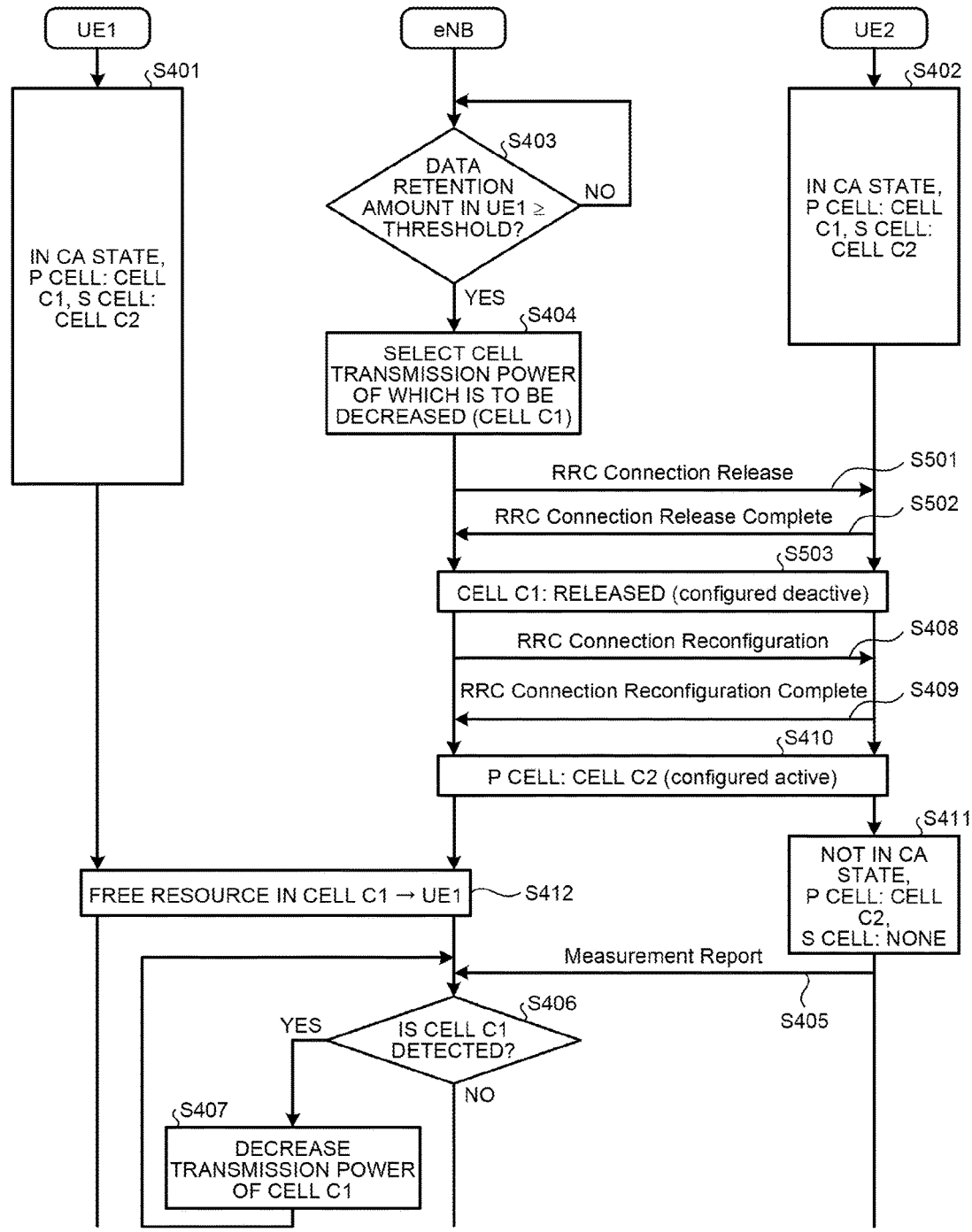
FIG. 12 is a flowchart for explaining the operation of the base station according to the second embodiment.

In this embodiment, the processing sequence in FIG. 12 may be performed instead of the processing sequence in FIG. 9. FIG. 12 is different from FIG. 9 in that the processes at Steps S405 to S412 are performed after the cell C1 is released from the communication terminal UE2. That is, after selecting the target cell, the base station eNB transmits, to the communication terminal UE2, RRC Connection Release including an instruction to release the connection of the cell C1 (Step S501). On the other hand, the communication terminal UE2 transmits RRC Connection Release Complete to the base station eNB (Step S502). Due to this, the connection between the base station eNB and the communication terminal UE2 in the cell C1 is released (Step S503).

As described above, according to this embodiment, the wireless communication unit 14 communicates with the communication terminals UE1 and UE2 that can perform communication using the cell C1 and the cell C2 at the same time. The transmission power controller 17 performs the following process when the retention amount of the transmission data to be transmitted to the communication terminal UE1 has been continuously equal to or larger than the threshold for a certain period of time or more, the communication terminal UE1 communicating with the base station 10 using both of the cell C1 and the cell C2 at the same time. That is, the transmission power controller 17 decreases the transmission power of the cell C1 used by the communication terminal UE2 so as to interrupt the use of the cell C1 by the communication terminal UE2 communicating with the base station 10 using both of the cell C1 and the cell C2 at the same time. That is, when the retention amount of the transmission data to be transmitted to the communication terminal UE1 has been continuously equal to or larger than the threshold for a certain period of time or more, the communication terminal UE2 different from the communication terminal UE1 is caused to be out of range of the cell C1.

In this way, when the communication terminal UE2 is caused to be out of range of the cell C1, the communication resource of the cell C1 that has been used by the communication terminal UE2 can be allocated to the communication terminal UE1 in which the retention amount of the transmission data in the base station 10 has been continuously equal to or larger than the threshold for a certain period of time or more. Accordingly, retention of the transmission data to be transmitted to the communication terminal UE1 is eliminated in the base station 10. According to this embodiment, communication can be efficiently performed in terms of utilization efficiency of the communication resources.

The use of the cell C1 by the communication terminal UE2 is interrupted by decreasing the transmission power to cause the communication terminal UE2 to be out of range of the cell C1, so that the use of the cell C1 can be interrupted without instructing the communication terminal UE2 to be disconnected from the cell C1. Accordingly, signaling can be decreased in interrupting the use of the cell C1 as compared with a case of interrupting the use of the cell C1 by the communication terminal UE2 with signaling such as a disconnection instruction. The communication terminal UE2 being out of range of the cell C1 does not need to transmit signaling (for example, Measurement Report) for connecting with the cell C1 to the base station 10. Due to this, signaling from the communication terminal UE2 can be decreased, so that power consumption of the communication terminal UE2 can be reduced. According to this embodiment, communication can be efficiently performed also in terms of the power consumption.

[c] Third Embodiment

Operation of Base Station

Figure 13:
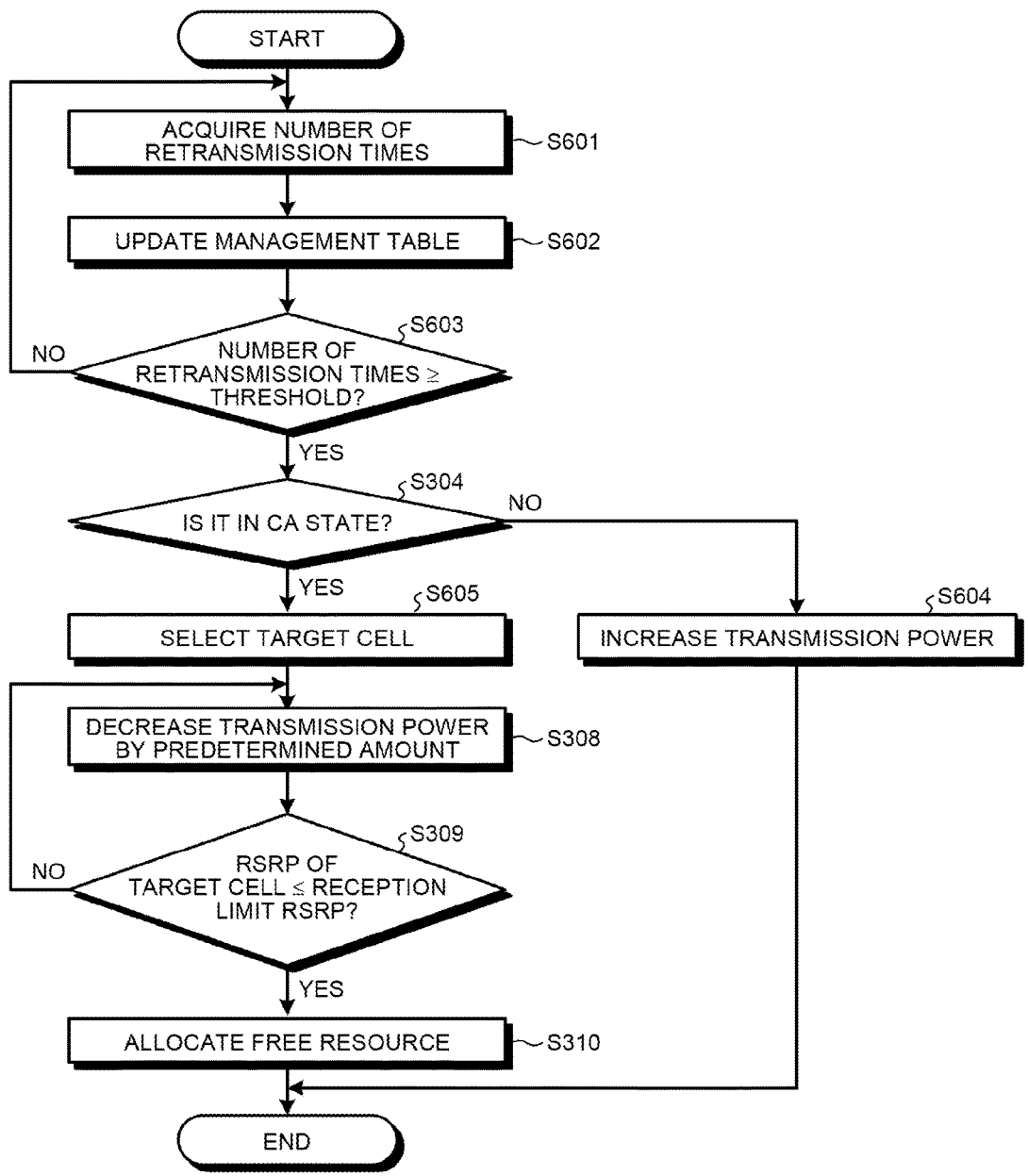
FIG. 13 is a flowchart for explaining an operation of a base station according to a third embodiment.

FIG. 13 is a flowchart for explaining an operation of the base station according to a third embodiment. The BB processing unit 13 retransmits the transmission data using an automatic repeat-request (ARQ), a hybrid ARQ, or the like. The BB processing unit 13 successively measures the number of retransmission times of the transmission data in the transmission buffer for each communication terminal.

The communication controller 12 monitors the measurement result by the BB processing unit 13 at a regular interval, and acquires the number of retransmission times of the transmission data from the BB processing unit 13 (Step S601). The communication controller 12 updates the management table (FIG. 3) included in the communication controller 12 based on the acquired the number of retransmission times (Step S602).

The communication controller 12 determines whether the number of retransmission times is equal to or larger than the threshold for each communication terminal (Step S603). When the number of retransmission times is smaller than the threshold for all of the communication terminals on the management table (No at Step S603), the communication controller 12 continues to acquire the measurement result by the BB processing unit 13 (Step S601).

When there is a communication terminal for which the number of retransmission times is equal to or larger than the threshold (Yes at Step S603), as in the second embodiment, the communication controller 12 determines whether the communication terminal is in the CA state (Step S304).

When the communication terminal for which the number of retransmission times is equal to or larger than the threshold is not in the CA state (No at Step S304), as in the first embodiment, the communication controller 12 instructs the transmission power controller 17 to increase the transmission power of the cell that is not used by the communication terminal. Following the instruction, the transmission power controller 17 and the amplification unit 18 increase the transmission power of the cell not used by the communication terminal that is not in the CA state, and causes the communication terminal to be in the CA state (Step S604) to end the process.

When the communication terminal for which the number of retransmission times is equal to or larger than the threshold is in the CA state (Yes at Step S304), the communication controller 12 selects the "target cell" (Step S605). As in the second embodiment, the "target cell" is a cell the transmission power of which is decreased. For example, when the communication terminal UE2 for which the number of retransmission times is equal to or larger than the threshold is being connected to the base station 10 using both of the cell C1 and the cell C2, the cell C1 and the cell C2 are "candidates for the target cell". The communication controller 12 selects, as the target cell, a cell in which larger number of communication resources are used by the communication terminal UE2 from among the cells C1 and C2 serving as the candidates for the target cell, and instructs the transmission power controller 17 to use the selected target cell. For example, when the number of resource blocks (RBs) used by the communication terminal UE2 is larger in the cell C1 than in the cell C2, the communication controller 12 selects the cell C1 as the target cell. The number of the RBs used by the communication terminal for which the number of retransmission times is equal to or larger than the threshold is the same in all of the candidates for the target cell, the communication controller 12 selects the P cell as the target cell from among the candidates for the target cell.

The processes at Steps S308 to S310 are the same as those in the second embodiment. However, in this embodiment, the communication terminal to which the free resource is allocated at Step S310 is assumed to be a communication terminal having higher priority in the management table (FIG. 3).

Processing Sequence of Communication System

Figure 14:
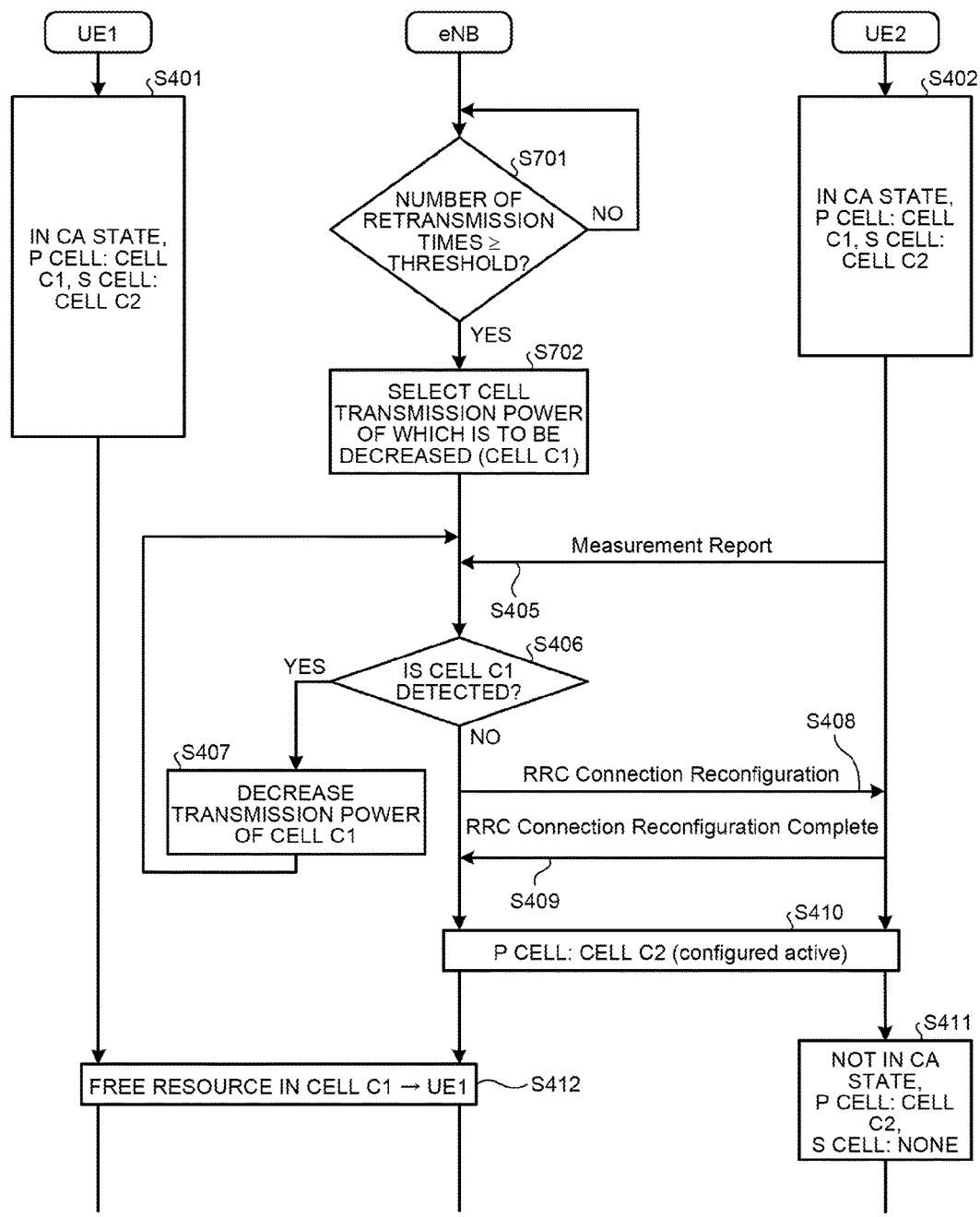
FIG. 14 is a diagram illustrating an example of a processing sequence of a communication system according to the third embodiment.

FIG. 14 is a diagram illustrating an example of a processing sequence of the communication system according to the third embodiment. The base station eNB in FIG. 14 corresponds to the base station 10 in FIG. 1. At the time when the processing sequence illustrated in FIG. 13 is started, as in the second embodiment, both of the communication terminals UE1 and UE2 are being connected to the base station eNB using both of the cell C1 and the cell C2. In this case, the cell C1 is the P cell and the cell C2 is the S cell. That is, both of the communication terminals UE1 and UE2 are in the CA state (Steps S401 and S402).

The base station eNB determines whether the number of retransmission times of the transmission data to be transmitted to each communication terminal is equal to or larger than the threshold for each communication terminal (Step S701). When the number of retransmission times is smaller than the threshold for all of the communication terminals (No at Step S701), the base station eNB repeats the determination at Step S701.

When the number of retransmission times of the transmission data to be transmitted to any of the communication terminals is equal to or larger than the threshold (Yes at Step S701), the base station eNB selects the target cell, that is, a cell the transmission power of which is to be decreased (Step S702). It is assumed herein that the communication terminal for which the number of retransmission times is equal to or larger than the threshold is the communication terminal UE2, and the cell C1 is selected as the target cell.

The processes at Steps S405 to S412 are the same as those in the second embodiment. However, in this embodiment, the communication terminal UE1 is assumed to be a communication terminal having higher priority in the management table. Accordingly, at Step S412, the base station eNB allocates the free resource in the cell C1 to the communication terminal UE1.

Figure 15:
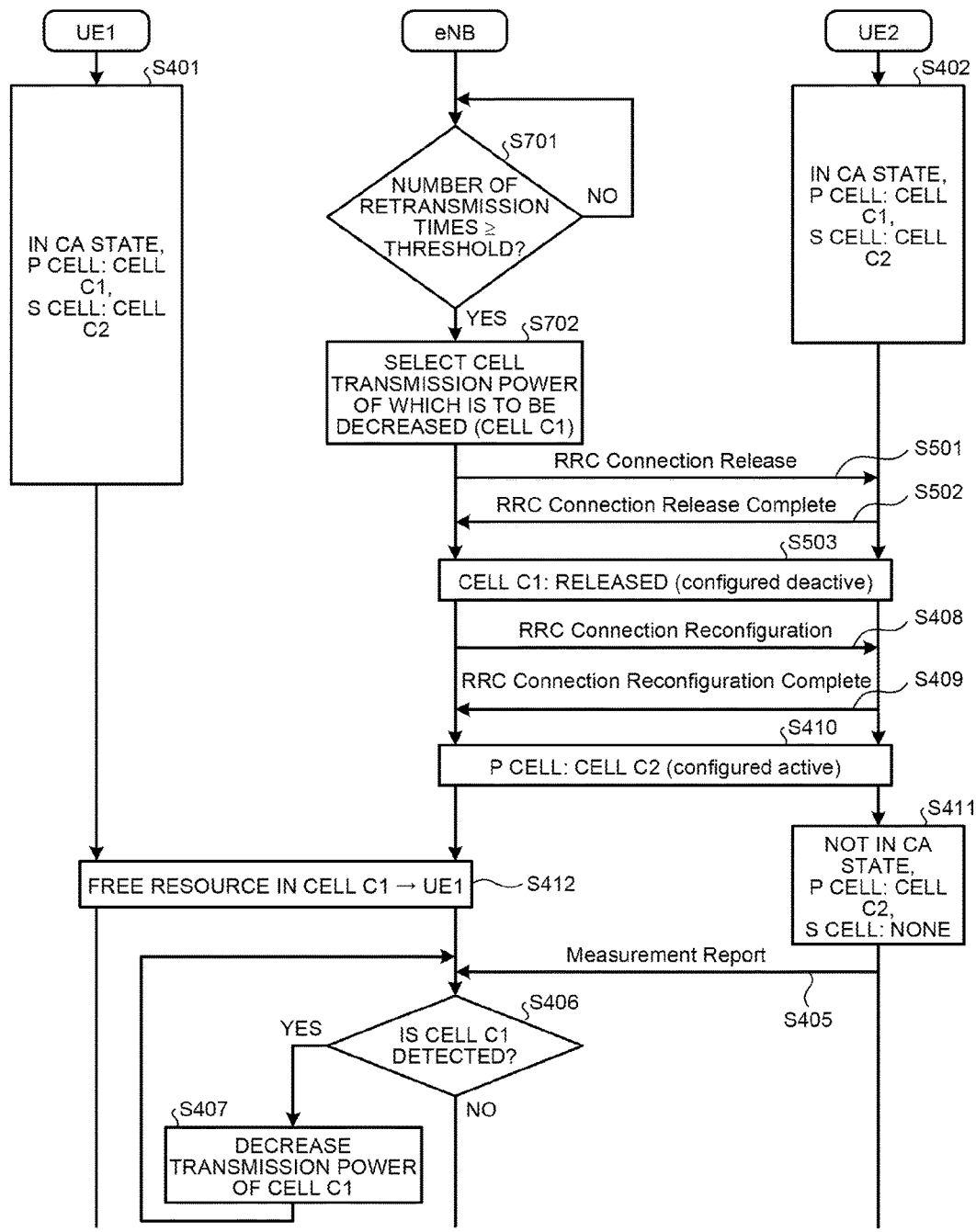
FIG. 15 is a diagram illustrating an example of the processing sequence of the communication system according to the third embodiment.

In this embodiment, the processing sequence in FIG. 15 may be performed instead of the processing sequence in FIG. 14. FIG. 15 is different from FIG. 14 in that the processes at Steps S405 to S412 are performed after the cell C1 is released from the communication terminal UE2 as in FIG. 12 (second embodiment).

Figure 16:
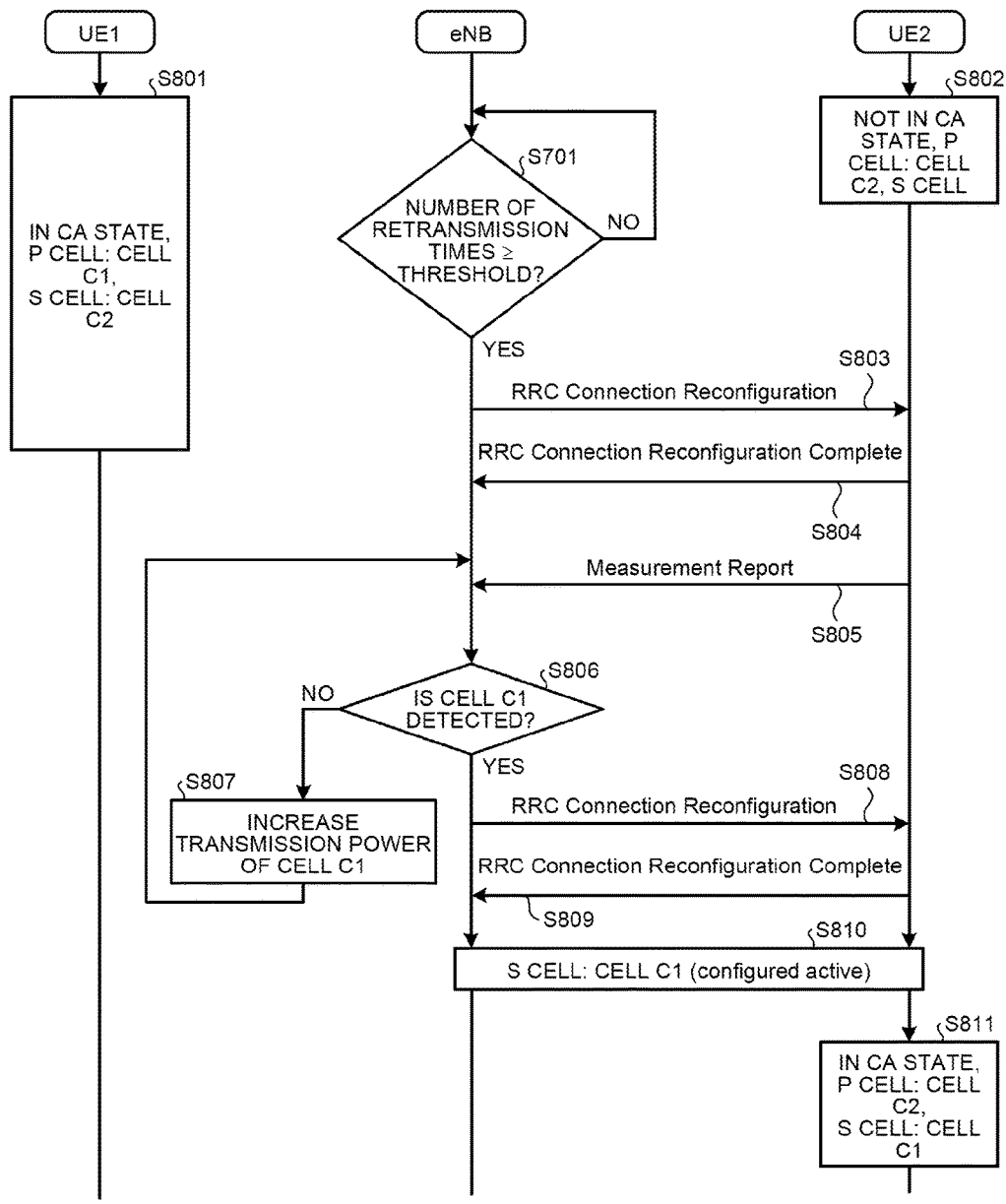
FIG. 16 is a diagram illustrating an example of the processing sequence of the communication system according to the third embodiment.

In this embodiment, the processing sequence flows as in FIG. 16 when the communication terminal for which the number of retransmission times is equal to or larger than the threshold is not in the CA state. At the time when the processing sequence illustrated in FIG. 16 is started, the communication terminal UE1 is being connected to the base station eNB using both of the cell C1 and the cell C2. In this case, the cell C1 is the P cell and the cell C2 is the S cell (Step S801). On the other hand, the communication terminal UE2 is being connected to the base station eNB using only the cell C2, and the cell C2 is the P cell (Step S802). That is, the communication terminal UE1 is in the CA state, and the communication terminal UE2 is not in the CA state.

In this state, when the number of retransmission times for the communication terminal UE2 is equal to or larger than the threshold (Yes at Step S701), the base station eNB performs the following process. That is, the base station eNB transmits, to the communication terminal UE2, RRC Connection Reconfiguration including a monitoring instruction for instructing the communication terminal UE2 to use the monitoring frequency f1 with the channel frequency f2 (that is, using the cell C2) (Step S803). On the other hand, the communication terminal UE2 transmits RRC Connection Reconfiguration Complete to the base station eNB (Step S804), and starts to transmit Measurement Report including the RSRP value with the channel frequency f1 as the monitoring result to the base station eNB (Step S805).

The base station eNB determines whether the communication terminal UE2 detects the channel frequency f1, that is, the cell C1 based on the monitoring result (Step S806). When the communication terminal UE2 does not detect the cell C1 (No at Step S806), the base station eNB increases the transmission power of the cell C1 by a predetermined amount (Step S807), and repeats the determination at Step S806 based on Measurement Report.

When the communication terminal UE2 detects the cell C1 (Yes at Step S806), the base station eNB transmits, to the communication terminal UE2, RRC Connection Reconfiguration including an instruction to connect to the cell C2 (Step S808). The communication terminal UE2 transmits RRC Connection Reconfiguration Complete to the base station eNB (Step S809). Accordingly, a connection using the cell C1 as the S cell is established between the base station eNB and the communication terminal UE2 (Step S810). That is, the communication terminal UE2 starts CA using both of the cell C1 and the cell C2 at the same time to be in the CA state (Step S811).

Operation of Communication System

First, with reference to FIG. 10, the following describes an operation when the number of retransmission times is equal to or larger than the threshold and the communication resource of the communication terminal in the CA state is released. The upper diagram of FIG. 10 illustrates a state in which both of the communication terminals UE1 and UE2 are being connected to the base station eNB using both of the cell C1 and the cell C2 as described at Steps S401 and S402 in FIG. 14. In this state, when the number of retransmission times of the transmission data to be transmitted to the communication terminal UE2 is equal to or larger than the threshold, the base station eNB decreases the transmission power of the cell C1 until the state of the lower diagram in FIG. 10 is obtained. That is, the base station eNB decreases the transmission power of the cell C1 until the communication terminal UE2 does not detect the cell C1, that is, until the communication terminal UE2 is out of range of the cell C1. Due to this, the communication resource used by the communication terminal UE2 in the cell C1 is released to be a free resource in the cell C1. The base station eNB then allocates the free resource in the cell C1 to the communication terminal UE1 having higher priority in the management table.

Figure 17:
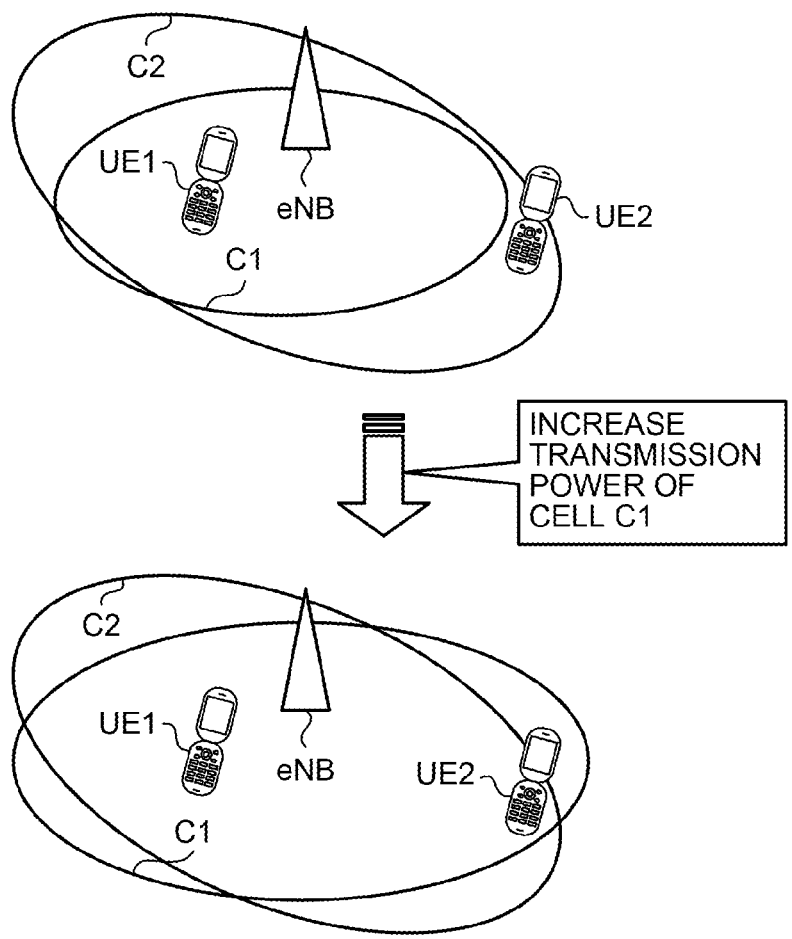
FIG. 17 is a diagram for explaining an operation of the communication system according to the third embodiment.

Next, with reference to FIG. 17, the following describes an operation when the number of retransmission times is equal to or larger than the threshold and the communication resource is allocated to the communication terminal not in the CA state. FIG. 17 is a diagram for explaining an operation of the communication system according to the third embodiment. The upper diagram of FIG. 17 illustrates a state in which the communication terminal UE2 is in connection using only the cell C2 and the communication terminal UE1 is in connection using both of the cell C1 and the cell C2 as described at Steps S801 and S802 in FIG. 16. In this state, when the number of retransmission times of the transmission data to be transmitted to the communication terminal UE2 is equal to or larger than the threshold, the base station eNB increases the transmission power of the cell C1 until the communication terminal UE2 detects the cell C1, that is, until the communication terminal UE2 is within range of the cell C1. Due to this, as illustrated in the lower diagram of FIG. 17, the communication terminal UE2 can be connected to the base station eNB using the cell C1 in addition to the cell C2, so that the communication terminal UE2 starts CA using both of the cell C1 and the cell C2 at the same time. When the communication terminal UE2 starts CA, communication resources allocated to the communication terminal UE2 are increased, so that the number of retransmission times of the transmission data to be transmitted to the communication terminal UE2 is suppressed to be smaller than the threshold in the base station eNB.

As described above, according to this embodiment, the wireless communication unit 14 communicates with the communication terminals UE1 and UE2 that can perform communication using the cell C1 and the cell C2 at the same time. The transmission power controller 17 decreases the transmission power of the cell C1 so that the use of the cell C1 by the communication terminal UE2 is interrupted when the number of retransmission times of the transmission data to be transmitted to the communication terminal UE2 is equal to or larger than the threshold, the communication terminal UE2 communicating with the base station 10 using both of the cell C1 and the cell C2 at the same time. That is, when the number of retransmission times of the transmission data to be transmitted to the communication terminal UE2 is equal to or larger than the threshold, the communication terminal UE2 is caused to be out of range of the cell C1.

When there is the communication terminal UE2 for which the number of retransmission times is equal to or larger than the threshold, utilization efficiency of the communication resources is decreased in the entire communication system. As described above, by causing the communication terminal UE2 to be out of range of the cell C1, the communication resource of the cell C1 that has been used by the communication terminal UE2 can be allocated to a communication terminal other than the communication terminal UE2, such as the communication terminal UE1 having higher priority. According to this embodiment, communication can be efficiently performed in terms of the utilization efficiency of the communication resources.

Because the use of the cell C1 by the communication terminal UE2 is interrupted by decreasing the transmission power to cause the communication terminal UE2 to be out of range of the cell C1, it is possible to interrupt the use of the cell C1 by the communication terminal UE2 without instructing the communication terminal UE2 to be disconnected from the cell C1. Accordingly, the signaling can be decreased in interrupting the use of the cell C1 as compared with a case of interrupting the use of the cell C1 by the communication terminal UE2 with signaling such as a disconnection instruction. The communication terminal UE2 that is out of range of the cell C1 does not need to transmit signaling (for example, Measurement Report) for connecting with the cell C1 to the base station 10. Due to this, the signaling from the communication terminal UE2 can be decreased, so that the power consumption of the communication terminal UE2 can be reduced. According to this embodiment, communication can be efficiently performed also in terms of power consumption.

According to this embodiment, when the number of retransmission times of the transmission data to be transmitted to the communication terminal UE2 is equal to or larger than the threshold, the communication terminal UE2 communicating with the base station 10 using only the cell C2, the transmission power controller 17 increases the transmission power of the cell C1 so that both of the cell C1 and the cell C2 are used by the communication terminal UE2 at the same time. That is, only when the number of retransmission times of the transmission data to be transmitted to the communication terminal UE2 is equal to or larger than the threshold, the transmission power of the cell C1 is increased to cause the communication terminal UE2 to be within range of the cell C1. Due to this, the communication terminal UE2 does not need to transmit signaling (for example, Measurement Report) for connecting with the cell C1 to the base station 10 until the number of retransmission times of the transmission data is equal to or larger than the threshold in the base station 10. Because the signaling transmitted from the communication terminal UE2 is decreased, the power consumption of the communication terminal UE2 can be reduced as compared with a case in which the communication terminal UE2 is always caused to perform CA regardless of the number of retransmission times. According to this embodiment, communication can be efficiently performed in terms of the power consumption.

The first to third embodiments have been described hereinabove. As described above, according to the first to third embodiments, the base station 10 is a base station that can form a plurality of cells C1 and C2 at the same time. The wireless communication unit 14 communicates with the communication terminals UE1 and UE2 that can perform communication using the cells C1 and C2 at the same time. The transmission power controller 17 controls the transmission power of each of the cells C1 and C2 to change the size of the communication area of each of the cells C1 and C2 so that the cell used by each of the communication terminals UE1 and UE2 is changed between the cells C1 and C2.

Accordingly, as in the first to third embodiments, communication can be efficiently performed by improving flexibility in changing a cell used by each communication terminal in the CA system.

[d] Other Embodiments (1) The above embodiment describes a case in which one base station forms a plurality of cells C1 and C2 to perform CA, as an example. That is, the above embodiment describes a case in which a communication terminal can be connected to a plurality of cells formed by one base station at the same time. However, the cell C1 and the cell C2 may be formed by a plurality of base stations that are different from each other. That is, the communication terminal may be connectable to a plurality of cells formed by a plurality of base stations at the same time. For example, a base station eNB1 may form the cell C1, a base station eNB2 may form the cell C2, and CA may be performed by the base station eNB1 and the base station eNB2 cooperating with each other.

Figure 18:
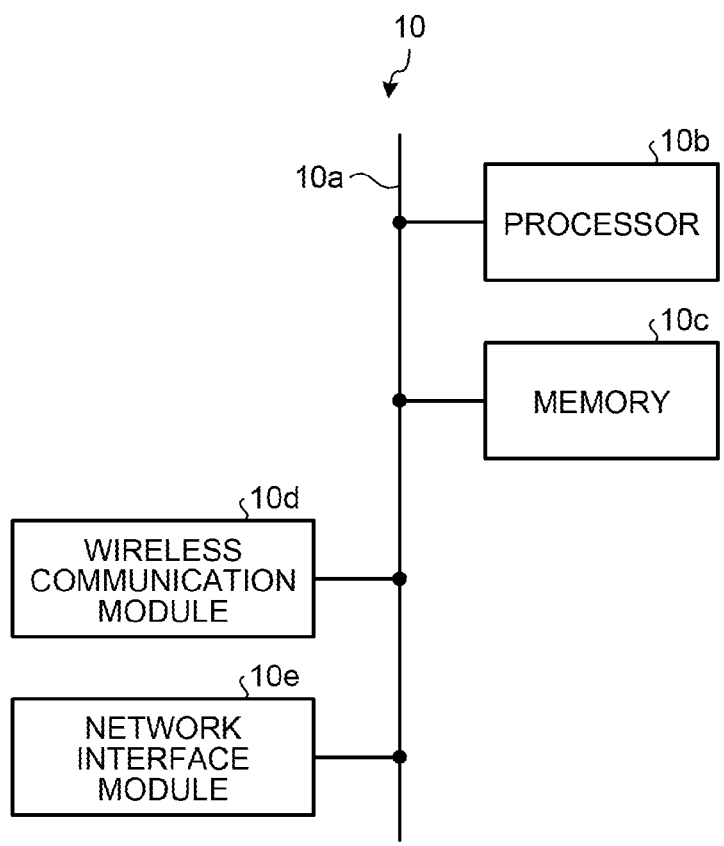
FIG. 18 is a diagram illustrating an example of a hardware configuration of the base station.

(2) The base station 10 according to the above embodiment may be made with the following hardware configuration. FIG. 18 is a diagram illustrating an example of the hardware configuration of the base station. As illustrated in FIG. 18, as components of the hardware, the base station 10 includes a bus 10a, a processor 10b, a memory 10c, a wireless communication module 10d, and a network interface module 10e. Examples of the processor 10b include a central processing unit (CPU), a digital signal processor (DSP), and a field programmable gate array (FPGA). The base station 10 may also include a large scale integrated circuit (LSI) including the processor 10b and a peripheral circuit. Examples of the memory 10c include a random access memory (RAM) such as a synchronous dynamic random access memory (SDRAM), a read-only memory (ROM), and a flash memory. The wireless communication unit 14 and the antennas 15 and 16 are made with the wireless communication module 10d. The network interface unit 11 is made with the network interface module 10e. The communication controller 12 and the BB processing unit 13 are made with the processor 10b. The management table is stored in the memory 10c.

According to an aspect of an embodiment, communication can be efficiently performed in the CA system.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
 a wireless communication transceiver configured to communicate with a communication terminal enabled to perform communication using a plurality of cells at the same time; and
 a controller comprising a processor that controls transmission power of each of the cells to change a size of a communication area of each of the cells to change a cell used by the communication terminal among the cells, wherein the cells include a first cell and a second cell, and when a retention amount of transmission data to be transmitted to a first communication terminal communicating with the base station using both of the first cell and the second cell at the same time has been continuously equal to or larger than a threshold for a certain period of time or more, the controller decreases transmission power of the first cell used by a second communication terminal to interrupt the use of the first cell by the second communication terminal communicating with the base station using both of the first cell and the second cell at the same time, and a priority of the first communication terminal is equal to or higher than a priority threshold and the priority of the second communication terminal is lower than the priority threshold.

2. The base station according to claim 1, wherein when a retention amount of transmission data to be transmitted to a first communication terminal communicating with the base station using only the first cell has been continuously equal to or larger than a threshold for a certain period of time or more, both of the first cell and the second cell are used by the first communication terminal at the same time by increasing transmission power of the second cell by the controller.

3. The base station according to claim 1, wherein when the number of retransmission times of transmission data to be transmitted to a first communication terminal communicating with the base station using both of the first cell and the second cell at the same time is equal to or larger than a threshold, the controller decreases transmission power of the first cell to interrupt use of the first cell by the first communication terminal.

4. The base station according to claim 1, wherein when the number of retransmission times of transmission data to be transmitted to a first communication terminal communicating with the base station using only the first cell is equal to or larger than a threshold, both of the first cell and the second cell are used by the first communication terminal at the same time by increasing transmission power of the second cell by the controller.

* * * * *